SYNCHRONOUS DETECTOR

Filed Oct. 17, 1963

INVENTOR:
ROBERT B. DOME,

BY Frank J. Thompson
HIS ATTORNEY.

United States Patent Office 3,291,902
Patented Dec. 13, 1966

3,291,902
SYNCHRONOUS DETECTOR

Robert B. Dome, Geddes Township, Onondaga County, N.Y., assignor to General Electric Company, a corporation of New York Filed Oct. 17, 1963, Ser. No. 316,899
4 Claims. (Cl. 178—5.4)

The present invention relates to synchronous detection and, more specifically, to an improved synchronous detector for use with color television.

In the compatible color television system employed in the United States, the transmitted signal consists essentially of a normal monochrome signal, conveying luminance information, supplemented by an additional modulated wave conveying chrominance information. To convey the chrominance information a sub-carrier wave is essentially separated into two components in quadrature, the individual components being amplitude modulated in accordance with first and second color difference signals. The color difference signals each consist of given combinations of three signals relating to red, green and blue components of the scene being transmitted and are generally referred to as the I and Q signals.

Generally, the I and Q color difference signals are recovered in a color television receiver by the use of synchronous detectors, such synchronous detectors employing locally generated signals of the same frequency as the chrominance sub-carrier to effect selective demodulation of the two signals. Prior art synchronous detectors have employed a pair of locally generated signals having the frequency of the chrominance sub-carrier and phase angles corresponding to the I and Q signals respectively. The use of two locally generated signals in this manner requires the use of a pair of balanced synchronous detectors. In prior art systems each detector has required the use of a pair of diodes.

The present invention eliminates the necessity of utilizing two peak detectors employing a pair of diodes each and features the use of but three diodes.

It is accordingly an object of the present invention to provide an improved synchronous detector.

Another object is to provide a simplified synchronous detector employing fewer elements than prior art detectors.

Yet another object is to provide an improved synchronous detector whereby the number of diodes necessary to effect detection is minimized.

These and other objects are achieved in one embodiment of the invention by the provision of a synchronous detector wherein detection of the I and Q signals is effected through the use of but three diodes. The chrominance side bands are detected through the use of three diode peak detectors which are respectively supplied with chrominance sub-carrier and locally generated signals at the frequency of the carrier and at three distinct phase angles thereto. The resultant three low frequency outputs from the peak detectors are then combined in proper proportions and polarities to obtain outputs representing the I and Q signals that are independent of carrier amplitude and which contain no quadrature distortion terms.

The novel and distinctive features of the invention are set forth in the appended claims. The invention itself, together with further objects and advantages thereof, may be best understood by reference to the following description and accompanying drawings in which:

Figure 1:
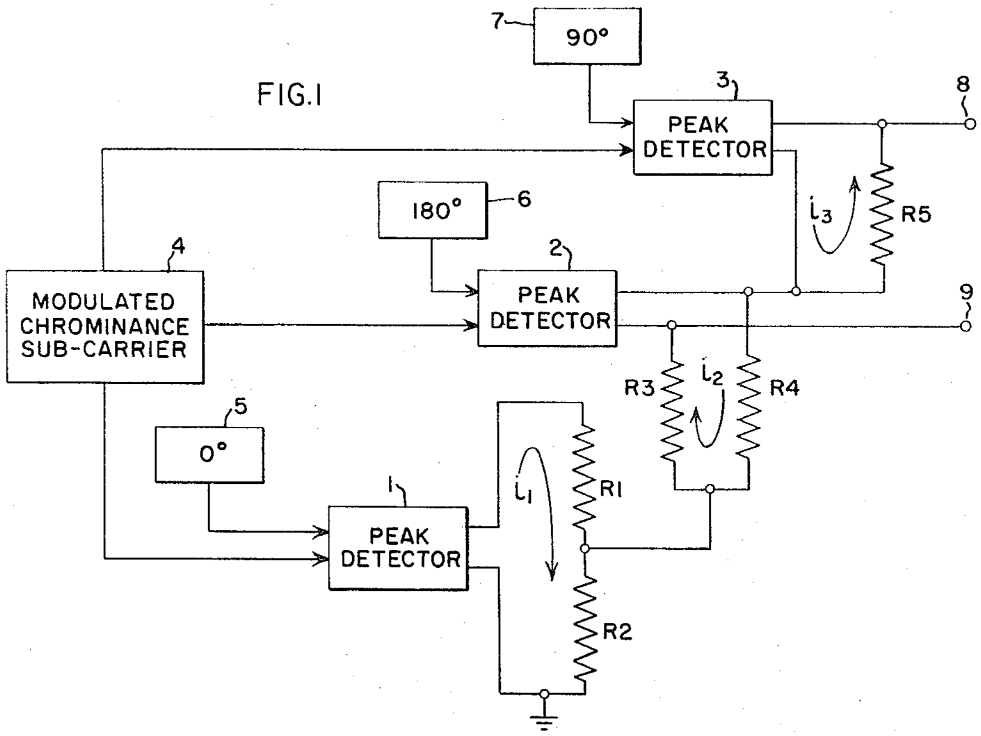
FIGURE 1 is a block diagram of one embodiment of a synchronous detector in accordance with the present invention.

Referring to FIGURE 1, there is shown in block diagram form an embodiment of the improved synchronous detector of the present invention wherein locally generated signals having the frequency of the chrominance sub-carrier and at 0°, 180°, and 90° phase angles thereto are employed. Although the use of these particular phase angles is desirable from the standpoint of circuit simplicity, other phase angles might be utilized within the teaching of the present invention.

Three peak detectors 1, 2, and 3, respectively, are supplied with the modulated chrominance sub-carrier by the source 4. A locally generated signal having the same frequency as the chrominance sub-carrier and at 0° phase angle thereto is applied to peak detector 1 by source 5. Similarly, peak detector 2 is provided with a locally generated signal at the same frequency as the chrominance sub-carrier and at a 180° phase angle thereto by the source 6. Peak detector 3 is supplied from source 7 with a locally generated signal having the frequency of the sub-carrier and at 90° phase angle thereto.

The load resistance R1–R5 are interconnected in such a manner as to combine the low frequency outputs of peak detectors 1, 2, and 3 in order to obtain the I and Q color difference signals at output terminals 8 and 9, respectively. The serially-connected load resistances R1 and R2 are connected across the output of peak detector 1, the junction between resistors R1 and R2 being connected to the junction between the serially-connected load resistors R3 and R4 which are connected across the output of peak detector 2. The load resistance R5 is connected across the output of peak detector 3, the low end of resistance R5 being connected to the high end of resistance R4. The values of the load resistors R1–R5 are so related as to insure symmetry and equal detector loading. In general, the resistances R1, R2, R3 and R4 are equal in value while resistance R5 is equal to the sum of resistance R1 and R2 or R3 and R4.

The operation of the synchronous detector depicted in FIGURE 1 can be best understood from the following mathematical analysis:

Since the chrominance sub-carrier is modulated in quadrature by the I and Q color difference signals, the resultant components can be represented by:

$$e=I \sin wt+Q \cos wt \quad (1)$$

The three locally generated signals having the frequency of the chrominance sub-carrier and at 0°, 180°, and 90° thereto are represented by the following equations:

$$e_1=E \cos wt \quad (2)$$

$$e_2=E \cos wt \quad (3)$$

$$e_3=E \sin wt \quad (4)$$

The total input to the three peak detectors thus becomes:

To device 1:

$$e_{1T}=E \cos wt+I \sin wt+Q \cos wt \quad (5)$$

To device 2:

$$e_{2T}=-E \cos wt+I \sin wt+Q \cos wt \quad (6)$$

To device 3:

$$e_{3T}=-E \sin wt+I \sin wt+Q \cos wt \quad (7)$$

The output of each of the peak detector 1, 2, and 3 can be found by taking the square root of the sum of the squares of the associated input. Thus, for the input to device 1, as represented by Equation 5, and grouping sin and cos terms, we arrive at:

$$\sqrt{(E+Q)^2+I^2} \quad (8)$$

which expands to:

$$\sqrt{E^2+2QE+Q^2+I^2} \quad (9)$$

which, by bringing E outside the radical, becomes:

$$E\sqrt{1+\left(\frac{I^2}{E^2}+\frac{2Q}{E}+\frac{Q^2}{E^2}\right)} \quad (10)$$

Expanding the radical by the use of the binomial expansion and ignoring high order terms Equation 10 becomes:

$$E\left[1+\tfrac{1}{2}\left(\frac{I^2}{E^2}+\frac{2Q}{E}+\frac{Q^2}{E^2}\right)-\cdots\right] \quad (11)$$

Multiplying through by E, the low frequency output of peak detector 1 is then seen to be:

$$e_{01}=E+\frac{Q^2}{2E}+Q+\frac{I^2}{2E}+\cdots \quad (12)$$

In a similar manner the low frequency outputs of peak detectors 2 and 3 become respectively:

$$e_{02}=E-Q+\frac{I^2}{2E}+\frac{Q^2}{2E}+\cdots \quad (13)$$

$$e_{03}=E-I+\frac{I^2}{2E}+\frac{Q^2}{2E}+\cdots \quad (14)$$

Thus, each output is seen to contain a term E representing the modulation, if any, of the locally generated signal, the desired component I or Q, and distortion and quadrature components:

$$\frac{I_2}{2E} \text{ and } \frac{Q^2}{2E}$$

Since the distortion and quadrature components are found to be positive for the output of each peak detector, it is possible to combine the output of the detectors to eliminate these components. Such combination is effected through interconnection of the load resistances R1–R5. The manner in which the various output signals of the detectors are combined can most easily be understood by tracing the paths from output terminals 8 and 9 to ground. The detected output current flows from the peak detectors 1, 2, and 3 through the associated load resistors in the direction shown by the arrows indicated as $I_1$, $I_2$ and $I_3$, respectively. Thus, tracing the path from terminal 8 to ground, the voltage at terminal 8 is seen to be defined by the voltage appearing across load resistors R5 and R4 and R2. The voltages appearing across the resistances R2 and R4 are seen to be additive and equal to one-half of the output voltage of the associated detectors since each detector is provided with two equal value serially-connected load resistors. The full output voltage of peak detector 3 appears across resistance R5 and is seen to be negative with respect to the voltage across resistances R2 and R4. Thus, the expression for the voltage at terminal 8 becomes:

$$V_8=\frac{e_{01}}{2}+\frac{e_{02}}{2}-e_{03} \quad (15)$$

Substituting equations 12, 13, and 14, the voltage at terminal 8 becomes:

$$V_8=I \quad (16)$$

Thus, the desired I color difference signal is seen to be available at terminal 8.

By tracing terminal 9 to ground, the voltage at terminal 9 is seen to be defined by the voltage appearing across load resistors R3 and R2. The voltages appearing across resistors R3 and R2 are equal to one-half of the output voltage of the associated detector for reasons as pointed out above. Further, these voltages are seen to be subtractive so that the expression for the voltage at terminal 9 becomes:

$$V_9=\frac{e_{02}}{2}+\frac{e_{01}}{2} \quad (17)$$

Substituting Equations 12 and 13 in Equation 17 the voltage at terminal 9 is seen to be:

$$V_9=Q \quad (18)$$

Thus, the desired Q color difference signal appears at terminal 9.

Figure 2:
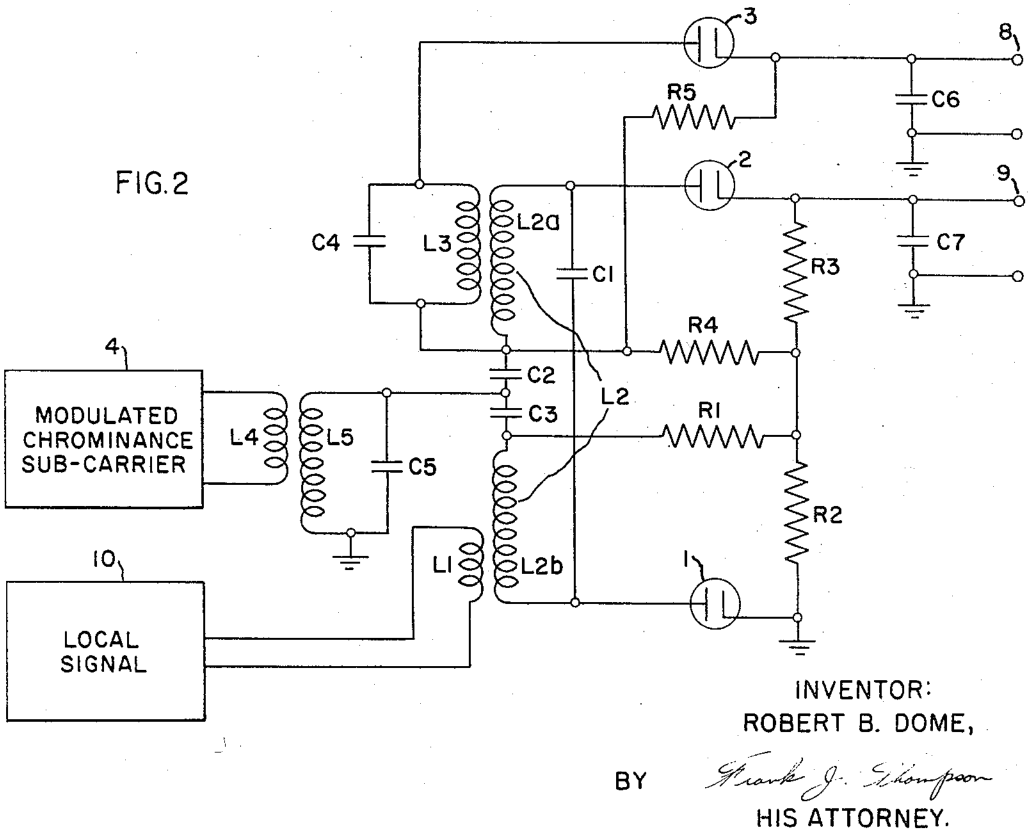
FIGURE 2 depicts, in schematic form, the improved synchronous detector of the present invention.

Referring to FIGURE 2, there is shown a circuit for implementing the synchronous detector of FIGURE 1. The reference numerals of elements of FIGURE 2 corresponding to those of FIGURE 1 are identical. Generally, the circuit of FIGURE 2 differs from the block diagram of FIGURE 1 by the showing of specific chrominance sub-carrier and local signal injection circuitry.

A locally-generated signal having the frequency and phase of the chrominance sub-carrier is coupled from source 10 through inductance L1 to a tank circuit comprising inductance L2 and C1, the inductance L1 being inductively coupled to inductance L2. The locally-generated signal is synchronized to the chrominance sub-carrier by the color brust which is transmitted on the "back porch" of the blanking pulse of the standard color television signal. Inductance L2 has its winding open at the center, to define two equal halves of inductance L2 which are designated L2A and L2B. The two halves of the inductance L2 thus formed are inductively coupled and are electrically connected together through a pair of serially-connected capacitances C2 and C3. The tank circuit comprised of inductance L2 and capacitance C1 is connected between the anodes of diodes 1 and 2 which serve as peak detectors and correspond to the block elements 1 and 2 respectively of FIGURE 1, to apply the local generated signal at the desired phase angles to these diodes.

A second tank circuit comprising inductance L3 and capacitance C4 is connected to the anode of peak detector diode 3 which corresponds to element 3 of FIGURE 1, inductance L3 being inductively coupled to the L2A portion of inductance L2 to apply the locally generated signal to diode 3 at the desired phase angle. The low end of the second tank circuit is electrically connected to the junction between inductance L2A and capacitance C2 so as to provide a path for the chrominance sub-carrier to be applied to diode 3.

The modulated chrominance sub-carrier is coupled from source 4 through inductance L4 to the third tank circuit comprising inductance L5 and capacitance C5, the inductances L4 and L5 being inductively coupled. The high end of the third tank circuit is electrically connected to the junction between capacitances C2 and C3 in order to apply the modulated chrominance sub-carrier to the anodes of the first, second, and third diode peak detectors at identical phase angles.

Load resistors R1 through R5 are connected to the cathodes of the diode peak detectors 1–3 and are interconnected in the same manner as previously discussed in connection with FIGURE 1. Capacitors C6 and C7, which serve as RF by-pass capacitors, are connected between ground and terminals 8 and 9, respectively.

In order to effect the desired synchronous detection, the locally-generated signal is applied to the diode peak detectors at the proper phase angle by the action of the first and second tank circuits. Since the anodes of diodes 1 and 2 are connected to opposite ends of the tank circuit comprised of inductance L2 and capacitance C1, the locally-generated signal is applied to these diodes 180° out of phase. Further, the second tank circuit, comprised of inductance L3 and capacitance C4, when tuned to resonance, applies the locally-generated signal to the diode peak detector 3 at the desired phase angle of 90° from that across the first tank circuit comprising inductance L2 and capacitance C1. Thus, the locally generated signal is applied to the first, second, and third diode peak detectors at phase angles of 0°, 180°, and 90°, respectively, to provide synchronous detection as discussed in connection with the FIGURE 1.

Since the modulated chrominance sub-carrier is applied to the junction between capacitances C2 and C3, this signal is applied to the diode peak detectors 1 and 2 at the same phase angle. Further, since the low side of the second tank circuit is connected between inductance L2A and capacitance C2 and is essentially at the potential of the modulated chrominance sub-carrier, the phase of this signal as applied to the diode peak detector 3 is the same as the phase angle at diode peak detectors 1 and 2. By injecting the modulated chrominance sub-carrier in this manner, the sub-carrier is applied to the diode peak detectors 1–3 in phase and will interact with the locally-generated signal of differing phase angles to effect synchronous detection as discussed in connection with FIGURE 1.

The low frequency components of the detected signals are combined through the interconnection of load resistances R1–R5 to provide the I and Q color difference signals at terminals 8 and 9, respectively, as previously discussed.

Although the invention has been described with respect to certain specific embodiments, it will be appreciated that modifications and changes may be made by those skilled in the art without departing from the spirit of the invention.

Therefore, what is claimed as new and desired to be secured by Letters Patent of the United States is:

1. In a color television receiver, a synchronous detector for recovering first and second color difference signals from a modulated chrominance sub-carrier, said detector comprising:

a. first, second, and third peak detectors,
b. means for applying the modulated chrominance sub-carrier to each of said peak detectors,
c. means for applying signals having the frequency of the chrominance sub-carrier and at 0°, 180°, and 90° phase angles thereto, to said first, second, and third peak detectors, respectively,
d. means for developing the sum of one-half of the low frequency output of said first peak detector and one-half of the low frequency output of said second peak detector, and
e. means for substracting the low frequency output of said third peak detector from said sum to recover the first color difference signal,
f. means for subtracting one-half of the low frequency output of said first peak detector from one-half of the low frequency output of said second peak detector to recover the second color difference signal.

2. In a color television receiver, a synchronous detector for recovering first and second color difference signals from a modulated chrominance sub-carrier, said detector comprising:

a. first, second and third peak detectors,
b. means for applying the modulated chrominance sub-carrier to each of said peak detectors,
c. means for applying signals having the frequency of the chrominance sub-carrier and at 0°, 180°, and 90° phase angles thereto, to said first, second, and third peak detectors, respectively,
d. first and second serially-connected resistances connected across the output of said first peak detector, each resistance being of a first value,
e. third and fourth serially-connected resistances connected across the output of said second peak detector, each resistance being of said first value,
f. a fifth resistance having a value of twice said first value connected across the output of said third peak detector,
g. the junction between said first and second resistances being connected to the junction between said third and fourth resistances, and
h. one end of said fifth resistance being connected to said fourth resistance and the output of said second peak detector.

3. In a color television receiver, a synchronous detector for recovering first and second color difference signals from a modulated chrominance sub-carrier, said detector comprising:

a. first, second and third peak detectors,
b. means for applying the modulated chrominance sub-carrier to each of said peak detectors,
c. means for applying signals having the frequency of the chrominance sub-carrier and at 0°, 180°, and 90° phase angles thereto, to said first, second, and third peak detectors, respectively,
d. first load means comprising first and second serially-connected resistances connected across the output of said first peak detector, each resistance being of a first value,
e. second load means comprising third and fourth serially-connected resistances connected across the output of said second peak detector, each resistance being of said first value,
f. third load means comprising a fifth resistance having a value of twice said first value connected across the output of said third peak detector,
g. first and second output terminals connected to said second and third load means respectively,
h. said first, second and third load means being interconnected so that,
    (1) said first output terminal is connected to ground through said fifth, fourth and second resistances to develop said first color difference signal, and
    (2) said second output terminal is connected to ground through said third and second resistances to develop said second color difference signal.

4. In a color television receiver, a synchronous detector for recovering first and second color difference signals from the modulated chrominance sub-carrier, said detector comprising:

a. first, second, and third diodes, each diode having an anode and cathode and serving as a peak detector,
b. a first inductance having first and second portions and a first capacitance connected in parallel between the anodes of said first and second diodes,
    (1) the first and second portions of said first inductance being connected to second and third capacitances, respectively, said capacitances being serially connected,
    (2) the junction between the first portion of said first inductance and said second capacitance being connected to the cathode of said first diode while the junction between the second portion of said first inductance and said third capacitance is connected to the cathode of said second diode,
c. means for inductively coupling a signal having the frequency and phase of the modulated chrominance sub-carrier to said first inductance,
d. a second inductance and fourth capacitance connected in parallel between the anode of said third diode and the junction between the second portion of said first inductance and said third capacitor,
    (1) said second inductance being inductively coupled to said first inductance,
e. means for coupling the modulated chrominance sub-carrier to the junction between said second and third serially-connected capacitances,
f. means for developing the sum of one-half of the low frequency output of said first diode and one-half of the low frequency output of said second diode, and g. means for subtracting the low frequency output of said third diode from said sum to recover the first color difference signal, h. means for subtracting one-half of the low frequency output of said first diode from one-half of the low frequency output of said second diode to recover the second color difference signal.

References Cited by the Examiner

UNITED STATES PATENTS 3,119,899 1/1964 Sziklai ------------- 178—5.4

FOREIGN PATENTS 803,087 10/1958 Great Britain.

OTHER REFERENCES

Three-Phase Detector for Color-TV Receivers, Goldberg, "Electronics," October 1956, pages 157–159.

Nonlinear and Parametric Phenomena in Radio Engineering, A. A. Kharkevich, May 1962, John F. Rider Publisher, Inc., pages 163–166.

DAVID G. REDINBAUGH, *Primary Examiner.*

J. H. SCOTT, J. A. O'BRIEN, *Assistant Examiners.*